(No Model.)

E. R. WHITNEY.
SECONDARY BATTERY.

No. 277,394. Patented May 8, 1883.

Witnesses:

Inventor,
Edwin Ruthven Whitney,
Per
Atty

UNITED STATES PATENT OFFICE.

EDWIN R. WHITNEY, OF MONTREAL, QUEBEC, CANADA.

SECONDARY BATTERY.

SPECIFICATION forming part of Letters Patent No. 277,394, dated May 8, 1883.

Application filed December 19, 1881. (No model.)

*To all whom it may concern:*

Be it known that I, EDWIN RUTHVEN WHITNEY, of the city of Montreal, in the district of Montreal and Province of Quebec, Canada, have invented certain new and useful Improvements in Secondary Batteries; and I do hereby declare that the following is a full, clear, and exact description of the same.

Heretofore attempts have been made to store the electric energy by charging a secondary battery therewith in such manner that the latent energy may be allowed to remain in said battery for a length of time and again be drawn off for utilization. This has been effected by immersing in a sulphuric-acid bath two flat plates of lead, which are covered with oxide of lead and insulated from each other by coverings of felt, leather, &c., and thus forming the positive and negative poles. These plates have also been bent into a number of folds. By these methods it has been found that only a comparatively small surface of the electrodes can be exposed or presented to the current with which they are to be charged, and thus the capacity and power of the secondary battery is necessarily limited. Again, from the fact of the charge being held in one solid plate or lump of lead, or one for each pole, as it is drawn off for utilization, the whole reservoir or store is drawn upon at once for the supply, and as it is gradually exhausted it constantly becomes weaker until the whole force has been spent, in this manner lessening its utility as a permanent and constant reservoir of energy.

Now, by my invention I overcome all these objections and provide a secondary battery or means for storing energy at once cheap and easily available, capable of being charged to a much greater extent than heretofore, and which will deliver a current or force of equal strength from the commencement of the discharge until the whole store has been exhausted.

The method which I have devised for effecting the above objects may be broadly described as consisting in subdividing the plates or pieces of lead, &c., heretofore used for the electrodes into a number of spherical or globular pieces or sections, and inclosing these pieces or sections in separate receptacles coated on their outsides with a non-conducting material, one of which receptacles will form the positive and the other the negative pole of the battery.

I will now proceed to describe my invention in sufficient detail to enable those skilled in the art to which it appertains to readily understand the same, referring also to the accompanying drawings, which illustrate the means employed in carrying the invention into effect.

Figure 1:
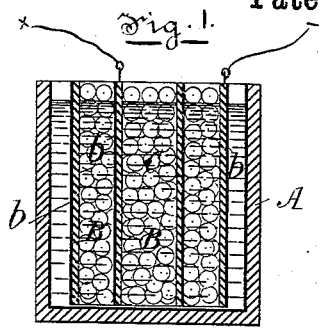
Figure 2:
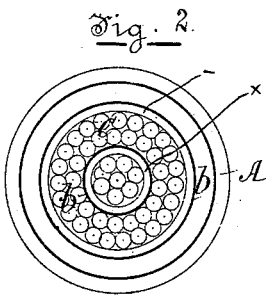
Figure 3:
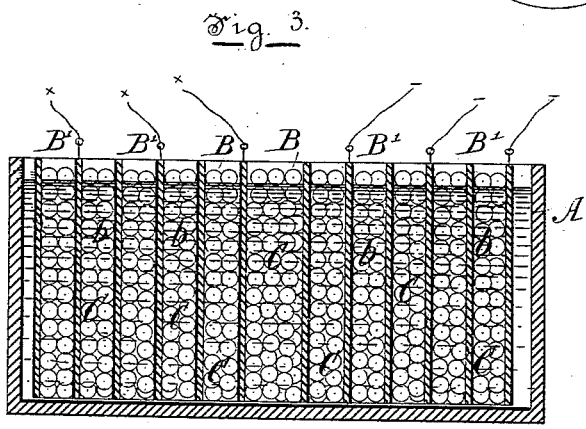

Figure 1 represents a vertical sectional view of a single battery constructed according to my invention, and Fig. 2 a plan view of same. Fig. 3 is a similar sectional view of a multiple battery, and Fig. 4 a plan of part of same.

Similar letters of reference indicate like parts.

A represents any ordinary or suitable jar or vessel, in the present case of circular form; but its configuration may of course be varied according to taste or to suit differing requirements, inside which I place (when constructing a single battery) two cylinders or vessels, B B, without either top or bottom, made of sheet-lead, or other material of equivalent properties, the outsides of which cylinders or vessels are coated, as shown at $b$, with asbestus or other non-conductor not susceptible to acid, and an outer covering of hair or similar binding material. Inside each of these cylinders or vessels B B, I place the lead which forms the electrodes. The jar or vessel A is of course filled with the usual bath of dilute sulphuric acid, which also permeates the interior and contents of the cylinders or vessels B B, which are arranged so that one vessel will form the positive pole and the other the negative.

In carrying out my principle of subdividing the lead which forms the substance of the electrodes, I prefer to use shot of any convenient or suitable size, as I find that this can be readily obtained at all times and at a small cost. This shot I propose to coat first with mercury, and afterward with red oxide of lead, as it is well known that these substances are very efficacious as conductors of electricity; but I may use only one of them or their chemical equivalents, or neither of them, at discretion, in the carrying out of my method of subdividing the electrodes; but I prefer to use the covering of mercury not only for coating the shot, but also for covering the inner surfaces of the vessels B B.

Figure 4:
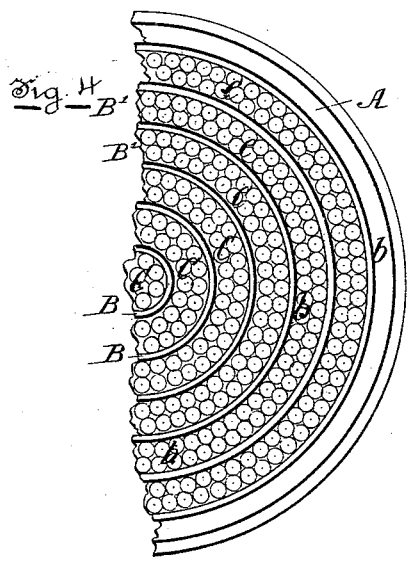

In Figs. 3 and 4 I have shown an arrangement whereby a multiple battery may be constructed. This will be used where strong currents have to be taken in different directions, and is formed by placing in the one vessel, A, additional cylinders or vessels, B' B', which will be filled with shot, (which is indicated in all the figures by C,) the vessels being insulated, as described, for the single battery, immersed in the usual bath, and arranged alternately positive and negative, and provided with proper electrical connections.

It will be manifest that by my invention the substitution is made of shot or small particles of lead for the large plates or lumps heretofore used.

I am aware that electrodes have been formed of divided or broken pieces of lead, and also that it is not new to amalgamate the electrodes or cover same with mercury, and therefore I do not claim same, broadly.

Having thus described my invention, what I claim, and desire to secure by Letters Patent, is as follows:

1. A secondary battery consisting of concentric tubes or chambers of conducting material coated on their outer surfaces with asbestus or other non-conducting material, arranged inside a jar or vessel, electrodes composed of lead shot, and an electrolytic fluid, substantially as described.

2. The herein-described secondary battery, which consists of an outer jar or vessel, concentric tubes or chambers arranged inside said vessel, and having their outer surfaces coated with asbestus and hair, electrodes composed of lead shot coated with mercury and red oxide of lead, and a solution of sulphuric acid as an electrolytic fluid, substantially as specified.

E. R. WHITNEY.

Witnesses:
R. A. KELLAND,
WM. H. KING.